Aug. 14, 1962  H. W. KULP  3,048,918
PISTON RING APPLYING AND REMOVING DEVICE
Filed Aug. 28, 1959  2 Sheets-Sheet 2
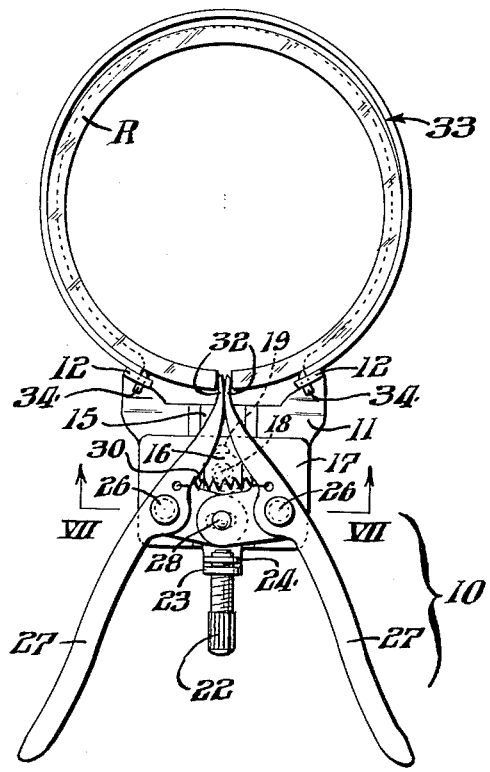
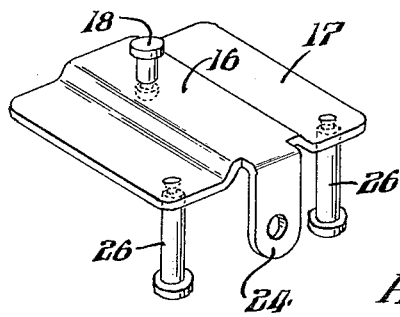
INVENTOR.
*Harry W. Kulp,*
BY *Paul & Paul*
ATTORNEYS.

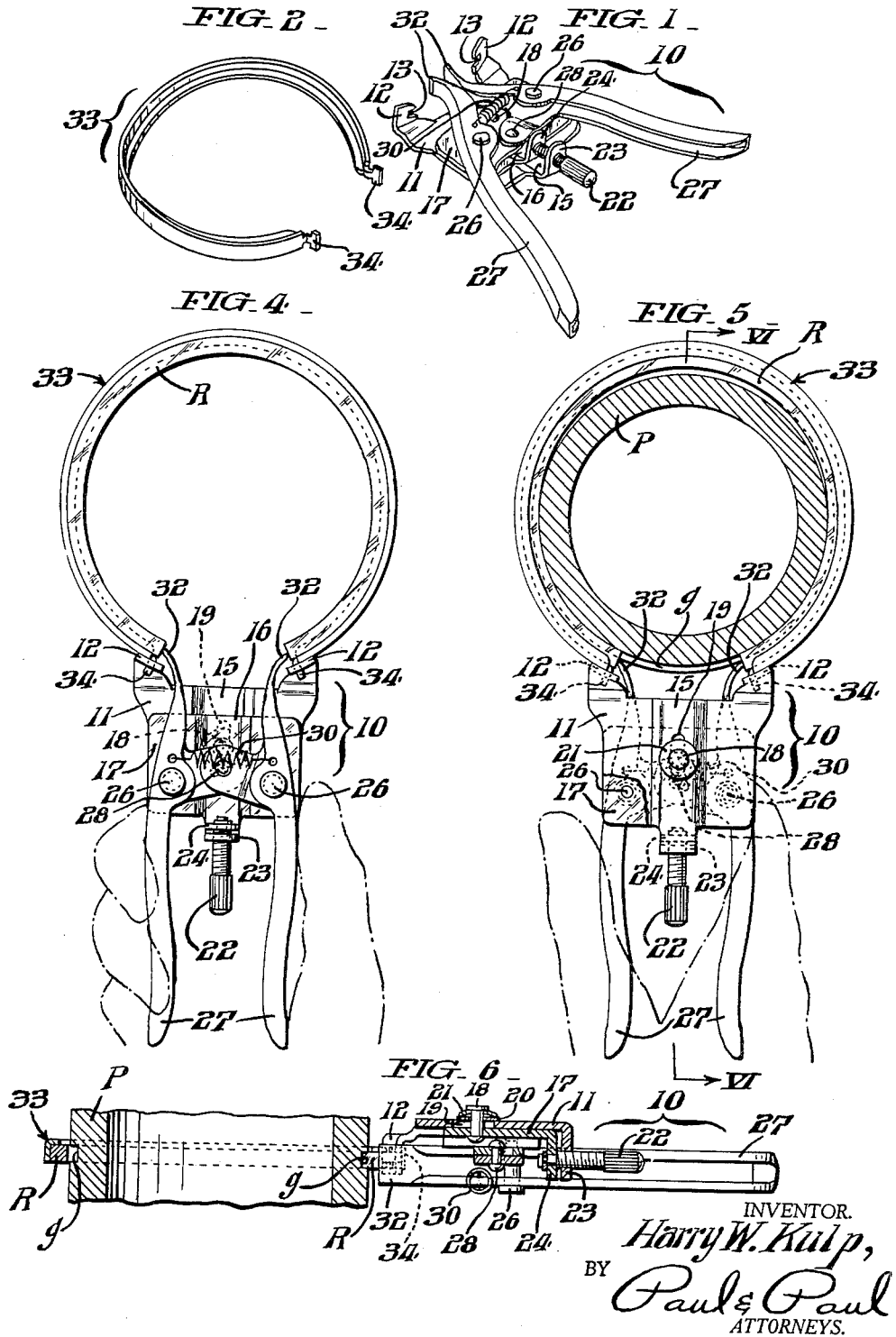

United States Patent Office 3,048,918
Patented Aug. 14, 1962

3,048,918
PISTON RING APPLYING AND REMOVING DEVICE
Harry W. Kulp, Lancaster, Pa., assignor to K-D Manufacturing Company, Lancaster, Pa.
Filed Aug. 28, 1959, Ser. No. 836,660
4 Claims. (Cl. 29—224)

This invention relates to devices for applying sealing rings to engine pistons or the like, of a type having an expander with grasp handles having finger ends whereby a piston ring temporarily placed in a holder attached to the expander can be dilated for impalement over the piston, and subsequently released to spring into a selected receiving groove of the piston, or whereby such a ring can be dislodged from its groove in the piston by a reverse procedure.

The chief aim of my invention is to provide a device of the kind referred to which is simple in construction; which lends itself to ready fabrication in quantity at small cost; and in which are embodied means whereby holders for rings of different sizes can be quickly and easily attached to the expander without the need of separate securing elements, and means whereby the grasp handles can be adjusted to accurately position their finger ends in the split interval of the piston ring after placement of the ring in the holder.

Other objects and attendant advantages will appear from the following detailed description of the attached drawings, wherein:

FIGS. 1 and 2 are perspective views respectively of a piston ring expander and a piston ring holder constructed in accordance with my invention.

FIG. 3 is a view in top plan with the holder attached to the expander in readiness for dilation of a piston ring previously placed in said holder.

FIG. 4 is a view similar to FIG. 3 showing how the expander is actuated to dilate the piston ring in the holder.

FIG. 5 is a view similar in turn to FIG. 4, showing how the piston ring, after being expanded, is impaled over the piston in readiness for release to spring into a selected groove of said piston.

FIGS. 6 and 7 are sectional views taken as indicated by the arrows VI—VI and VII—VII respectively in FIGS. 5 and 3; and FIG. 8 is a perspective view of one of the parts of the expander.

With more detailed reference to these illustrations, it will be noted that the expander generally designated by the numeral 10 comprises a member 11 which, in practice, is fashioned from suitably stiff plate metal to generally rectangular configuration and provided with a pair of laterally-spaced upturned lugs 12 of which the confronting edges are notched as indicated at 13 in FIG. 1. As further shown, the member 11 has an offset 15 medially thereof to serve, in a plane centrally between the lugs 12, as a guideway for engagement by a corresponding offset 15 of a slide 17 which is likewise struck from suitably stiff sheet metal. Fixed centrally in the slide 17 is a stud 18 of which the shank passes through a slot 19 in the member 11, said stud having a head between which and the back of said member, a friction washer 20 and a spring washer 21 are interposed. The slide 17 is adjustable within the limits of the slot 19 by means of an adjusting screw 22 which is threadedly engaged in an outstanding ear 23 of the member 11 and restricted to rotation in an outstanding ear 24 of the slide 17.

Fulcrumed resepctively upon studs 26, also anchored in the slide 17 and equally spaced relative to the longitudinal plane of the guideway, are grasp handles 27 in the form of levers of which lateral arms of equal length extending inwardly respectively from the handles at the fulcrum region overlap as shown, one of said arms having a pivot pin 28 secured therein and the other arm having a slotted engagement with said pin. A tension spring 30 serves to keep the grasp handles 27 normally positioned as in FIG. 3, with the finger ends 32 of said handles abutting in the medial plane between the lugs 12.

For use with the expander 10, I provide in practice, piston ring holders of different sizes for rings of different diameters such as the one exemplified in FIG. 2 and there designated by the numeral 33. The illustrated holder 33 is fashioned to the form of a split annulus from flexible angle section strip material, and, in accordance with the invention, each such holder is provided at opposite ends with outwardly extending radial tabs 34 which are T-shaped and adapted to interlock with the notched lugs 12 of the supporting member 11 of the expander 10 in a manner presently explained.

To prepare the device for application of a ring to a piston, a holder 33 of the proper size is selected for the ring. The selected holder is then radially compressed slightly, and its tabs 34 brought into the interval between the lugs 12 of the expander 10, and thereupon released for engagement of said tabs into the notches 13 of said lugs as the holder relaxes by reason of its resiliency. Due to being T-shaped, the tabs 34 effectively lock with the lugs 12 so that the holder is releaseably but rigidly connected to the supporting member 11 of the expander 10 in a manner readily understood. With the foregoing accomplished, a ring R is placed within the holder 33 as shown in FIG. 3 so as to rest upon the inwardly directed flange of said holder. The slide 17 is next adjusted to bring the finger ends 32 of the grasp handles 27 up into the split of the ring R as also shown in FIG. 3. Thereupon the grasp handles 27 are pressed together against the resistance of the spring 30 with the result that the ring R is dilated within the holder by the spreading action of the finger ends 32 of said handles upon the ends of said ring. With the handles 27 pressed as just explained to keep the ring dilated, the assemblage is inverted and the ring impaled over the piston P as in FIG. 5 to the level of a receiving groove $g$ in the piston. Finally, upon being relieved of pressure, the grasp handles 27 are returned by the spring 30 to their normal positions so as to allow the ring R to contract into the groove $g$ of the piston and incidentally free itself from the holder 33. After placement of the ring R, the device is removed by slipping the holder 33 from over the piston in readiness for use in applying another ring R in like manner. Removal of rings from the piston can obviously be accomplished with the device simply by reversal of the above procedure.

While in accordance with the provisions of the statutes, I have illustrated and described the best form of embodiment of my invention now known to me, it will be apparent to those skilled in the art that changes may be made in the form of the device described without departing from the spirit and scope of the invention as set forth in the appended claims, and that in some cases certain features of my invention may be used to advantage without a corresponding use of other features.

Having thus described my invention, I claim:

1. As a new product of manufacture, a device for applying or removing a split sealing ring to or from an engine piston or the like, comprising a supporting member with a pair of laterally spaced projecting lugs at the top; a split annular angle-section resilient holder component for reception of a piston ring, said holder having its ends formed with lugs to detachably interlock respectively with the lugs on the supporting member so as to be so held in place by the resiliency of the holder component; a normally retracted slide associated with the supporting member and constrained for adjustment in a plane radially of the holder medially between the lugs of said member; a pair of actuating grasp handles fulcrumed respectively about transversely spaced studs on the slide, said handles being provided with finger projections for reaching into the split interval of the piston ring when in the holder, and with arms of equal length respectively extending laterally inward from said handles into overlapping relation from the fulcra of said handles, the arm of one of said handles having a slotted connection with pivot pins secured in the arm of the other handle; means influential upon the handles for normally maintaining the finger ends thereof yieldingly in contact with each other in readiness to be entered into or withdrawn from the split interval of the held piston ring; and means for adjusting the slide relative to the supporting member.

2. The invention according to claim 1, wherein the means for normally maintaining the fingers of the handles in yielding contact with each other is in the form of a helical tension spring spanned crosswise between said finger projections.

3. The invention according to claim 1, wherein the adjusting means comprises a screw rotatively engaged in a projection centrally of the bottom of the slide and threadedly engaged in a projection centrally of the bottom of the supporting member.

4. The invention according to claim 1, wherein the lugs on the holder are invert T-shaped for locking engagement with inwardly directed lateral notches in the lugs at the top of the supporting member.

References Cited in the file of this patent

UNITED STATES PATENTS

| 1,663,084 | Ling | Mar. 20, 1928 |
| 1,767,819 | Solenberger | June 24, 1930 |
| 1,811,248 | Spencer | June 23, 1931 |
| 2,280,557 | Stromgren | Apr. 21, 1942 |

FOREIGN PATENTS

| 719,159 | Germany | Mar. 31, 1942 |

UNITED STATES PATENT OFFICE
CERTIFICATE OF CORRECTION

Patent No. 3,048,918                                August 14, 1962

Harry W. Kulp

It is hereby certified that error appears in the above numbered patent requiring correction and that the said Letters Patent should read as corrected below.

Column 3, line 9, for "pivot pins" read -- a pivot pin --.

Signed and sealed this 8th day of January 1963.

SEAL)
Attest:

ERNEST W. SWIDER                                DAVID L. LADD
Attesting Officer                                     Commissioner of Patents